United States Patent Office 2,729,334
Patented Jan. 3, 1956

2,729,334

PURIFICATION OF PAPER MILL WHITE WATER BY FROTH FLOTATION

Rudolf Schwarz, Oberlahnstein, and Theodor Hennig, Braubach, Germany, assignors to Zschimmer & Schwarz, Brilon, Westphalia, Germany No Drawing. Application October 27, 1951, Serial No. 253,572

4 Claims. (Cl. 210—53)

The present invention relates to an agent and process for the purification of waste liquids of the cellulose, paper, and cardboard industries, said waste liquor containing fillers and small amounts of fibers termed white water in the art.

Up to the present, the purification of the waste liquids in the above mentioned industries, which comprises the separation and recovery of the fiber materials and fillers contained in the waste liquids, is effected in two entirely different ways.

One method is carried out in sedimentation devices, in which the floating substances are allowed to settle. This requires large space for the sedimentation, which may, by the way, be accelerated by the addition of substances promoting flocculation and coagulation.

Another method is the floation process, according to which fiber and filler materials are caused to rise to, and float on, the surface of the liquid. This process requires, almost without exception, the use of the flotation adjuvants. A large number of substances have been suggested for that purpose, for instance resin soap, animal glue, solvents, such as pine oil, soaps, and sulfonated oils.

In order to make the flotation process work under varying conditions, it is necessary to apply substances as flotation aids, which are dependable to act uniformly under any variations of the composition of the waste liquids, their contents in colloids and electrolytes, degree of acidity, temperature, and other varying conditions. It is known that the substances commonly used as flotation agents are very sensitive to such changes. It is furthermore known that some flotation agents are likely to lead to undesired side effects in the processing of the recovered materials, such as formation of stains in the paper, and sticking of the web to the presses.

It is an object of the present invention to provide flotation agents which are free of the above-mentioned inconveniences.

It is a further object of the invention to provide such agents which are not sensitive to changes in the composition of the waste liquids.

It is yet another object of the invention to provide flotation agents which do not exhibit any undesired side effects.

Other objects and advantages of the agent and process according to the invention will be seen from the following specification.

It has been discovered that preparations of the desired properties may be obtained by combining sulfonated fatty materials with protein solutions. These preparations are very effective as flotation agents, promote flocculation, are to a large extent insensitive to changes in the composition of the waste liquids, and are free of any undesired side effects in the further processing of the recovered materials.

Thus, the promoting effect of protein in flotation is poor, whereas that of sulfonated oil is good. On the other hand, oil sulfonates have the disadvantage of causing stains and stickiness in the recovered materials. When combined, the two substances exhibit properties which surpass the added effect of the components, while at the same time the inconveniences mentioned with respect to oil sulfonate have disappeared.

Moreover, the activity of the oil sulfonate is maintained even with low pH value and high aluminum sulfate content of the liquid, whereas the activity is considerably reduced without the addition of protein under the above-mentioned conditions.

The combined use of oil sulfonate, more particularly castor oil sulfonate and protein solutions, in particular glue or keratin solutions, has, moreover, a decidedly coagulating effect on components of the waste liquids. Even the finest filling materials or floating substances are recovered in the separated flakes, substances which could only be separated otherwise by very prolonged sedimentation periods. The water thus treated is of a much higher degree of purity than otherwise obtainable.

The amounts of oil sulfonate and protein solution in the mixture may vary within wide limits. Among the oil sulfonates which may be used according to the invention are the sulfonates of castor oil and similar oily compounds, such as tea seed oil, olive oil, cotton seed oil, or the sulfonates of the fatty acids derived therefrom.

Among the protein solutions are solutions of glue, degraded glue, gelatine, keratin, albumin, etc.

In the following, the preparation of the agent and the process according to the invention will be illustrated by several examples, but it should be understood that these are given by way of illustration and not of limitation and that many modifications thereof may be made without departing from the spirit of the invention.

*Example 1*

10 parts of animal glue are heated to 80° C. with one part of soda in 50 parts of water for one hour; subsequently, 50 parts of castor oil sulfonate with a fat content of 35% are added to the mixture. A solution containing 20 g. per liter of the mixture is added continuously to the wastes containing the paper pulp. Depending on the kind of paper pulp in the waste liquids, the quantities to be added are .5 to 10 mg. per liter waste. The rising paper pulp is subsequently separated from the purified waste liquid in suitable flotation devices.

The process is useful for all kinds of fiber pulps; it works best at pH values between 4 and 7. This is the range in which the waste emerges from the pulp plant.

While we have mentioned a temperature of 80° C. in the example, the heating can be carried out with good success at temperatures ranging from 50 to 100° C.

*Example 2*

One hundred parts of a solution containing 200 g. per liter keratin, obtained by boiling of keratin with caustic soda solution, are mixed with 15 parts of a sulfonate of cotton seed oil with a fat content of 50%.

The mixture is used as directed in Example 1.

*Example 3*

Fifty parts of a sulfonated and subsequently neutralized fatty acid derived from olive oil are mixed with 100 parts of glue and 100 parts of gelatin dissolved in 1000 parts of water.

The mixture is used as directed in Example 1.

From the foregoing examples, it is seen that the ratio of protein to sulfonated oil in Example 1 is 1:5, the ratio of protein to sulfonated oil in Example 2 is about 20:7.5 (the sulfonate is at a strength of 50% and 15 parts thereof are used), and the ratio of protein to sulfonate in Example 3 is 200:50.

Accordingly, the examples show that the amount of protein which is effective to produce the enhanced promoting effect in the flotation with sulfonated oil and which eliminates the undesirable staining of the fibers in the paper and in the web in the presses may vary widely. The ratio of protein to sulfonated oil may vary as shown in Example 1 from about 20% to a value of about 400% as shown in Example 3.

*Example 4*

A solution containing 20 g. per liter of the preparation described in Example 1 is continuously added to the paper pulp collecting at the sand trap of a paper manufacturing device, the amount of solution being about .10 mg. per liter. Flocculation sets in, which enhances the retention of the pulp on the sieve, promotes matting, and increases the binding of fillers, thus causing the water after straining to leave the sieve in a considerably purer condition than it does in the absence of the additional agent. Moreover, when subsequently purified in accordance with the customary flotation or sedimentation processes, the water will be of an excellently pure condition.

The present invention is, therefore, very successful for purifying waste liquids by processes of flotation or sedimentation even when a very small amount of agent is added, and under varying conditions to which waste liquids may be subject.

What we claim is:

1. The process for the purification of white water waste containing suspended solids and fibers from cellulose, paper, and cardboard manufacture which comprises subjecting said white water waste in an acid condition to a froth flotation in the presence of a flotation agent consisting of a mixture of sulfonated fatty materials selected from the group consisting of sulfonates of castor oil, tea seed oil, cotton seed oil, and the sulfonates of the fatty acids derived therefrom, with protein solutions selected from group consisting of glue, dehydrated glue, gelatine, keratine, albumin, the amount of the protein relative to the oil sulfonate by weight in the said mixture varying from about 20% to about 400% and said flotation agent being added to said white water waste in an amount from about .5 to 10 milligrams per liter of said waste whereby the suspended solids and fibers are floated in said white water waste and separating the floated materials from the white water, said floated material being rendered free from stickiness and stain.

2. The process set forth in claim 1 in which said flotation agent is continuously added to the paper pulp collecting at a sand trap in a paper manufacturing process.

3. The process set forth in claim 1 in which said flotation agent is a mixture of protein and sulfonated oil dispersed in water in a concentration of 20 grams per liter of said water which is added to 1 liter of said white water.

4. The process set forth in claim 1 in which the white water waste has a pH value between about 4 and 7.

References Cited in the file of this patent

UNITED STATES PATENTS

| Number | Name | Date |
|---|---|---|
| 1,906,029 | Weinig et al. | Apr. 25, 1933 |
| 2,019,306 | Handy | Oct. 29, 1935 |
| 2,154,231 | Daimler et al. | Apr. 11, 1939 |
| 2,240,403 | Karlstrom | Apr. 29, 1941 |
| 2,248,177 | Karlstrom | July 8, 1941 |
| 2,347,147 | Booth | Apr. 18, 1944 |
| 2,365,619 | Bagley et al. | Dec. 19, 1944 |
| 2,365,805 | Cole | Dec. 26, 1944 |
| 2,385,054 | Booth et al. | Sept. 18, 1945 |
| 2,440,514 | Karlstrom | Apr. 27, 1948 |
| 2,477,402 | Booth et al. | July 26, 1949 |
| 2,518,814 | Penten | Aug. 15, 1950 |

OTHER REFERENCES

Serial No. 311,682, Gotte, (A. P. C.), published May 25, 1943.